United States Patent [19]
Murray et al.

[11] Patent Number: 5,802,318
[45] Date of Patent: Sep. 1, 1998

[54] UNIVERSAL SERIAL BUS KEYBOARD SYSTEM

[75] Inventors: David E. Murray, Houston; David R. Wooten, Spring; Randall L. Hess, Cypress; Christopher C. Wanner, Tomball; Jeff W. Wolford, Spring, all of Tex.

[73] Assignee: Compaq Computer Corporation, Houston, Tex.

[21] Appl. No.: 506,884

[22] Filed: Jul. 25, 1995

[51] Int. Cl.$^6$ ............... G06F 3/00; G06F 9/46
[52] U.S. Cl. ............... 395/280; 395/868; 395/733; 395/500
[58] Field of Search ............... 395/280, 828, 395/733, 866, 868, 500, 835, 838

[56] References Cited

U.S. PATENT DOCUMENTS

| | | | |
|---|---|---|---|
| 4,578,671 | 3/1986 | Flowers | 340/636 |
| 4,942,606 | 7/1990 | Kaiser et al. | 380/4 |
| 5,590,315 | 12/1996 | Hess et al. | 395/500 |

OTHER PUBLICATIONS

Pentium™ Processor User's Manual vol. 3: Architecture and Programming Manual by Intel®, 1993 (Chapters 1-4, 9-15, 20 and 22).

Microprocessor and Peripheral Handbook vol. II Peripheral by Intel®, 1988, pp. 5-55 to 5-74.

Universal Serial Bus Specification by Compaq, Digital Equipment Corporation, IBM PC Company, Intel, Microsoft, NEC, Northern Telecom, Revision 0.9, Apr. 13, 1995.

ACCESS.bus ™ microcontroller 83C542/87C542 Phillips Semiconductors Objective Specification, pp. 1-22, Apr. 3, 1995.

*Primary Examiner*—Glenn A. Auve
*Attorney, Agent, or Firm*—Pravel, Hewitt, Kimball & Krieger

[57] ABSTRACT

A keyboard system according to the present invention includes a serial bus host controller coupled to a serial bus keyboard. The keyboard includes both keyboard scan logic and scan code conversion logic for passing to the host controller over the serial bus. The host controller includes circuitry for processing the data between the serial bus and a host bus. The host controller further includes 8042 emulation logic for providing a hardware compatible interface to the keyboard controller. The 8042 emulation logic also includes circuitry for communicating over the serial bus during times when the serial bus has not yet been initialized.

33 Claims, 10 Drawing Sheets

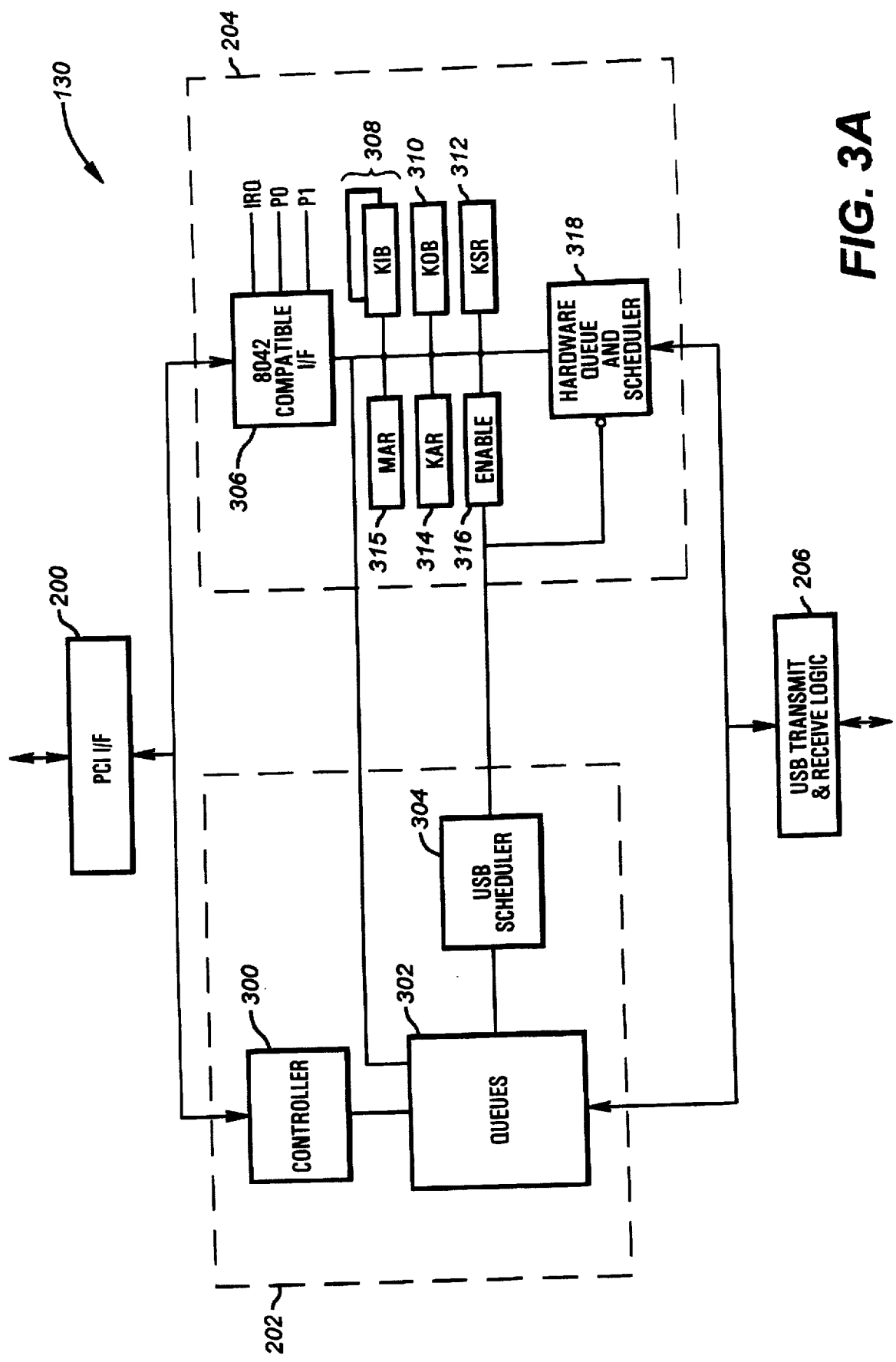

UNIVERSAL SERIAL BUS KEYBOARD SYSTEM

BACKGROUND OF THE INVENTION

1. Field of the Invention

The invention relates to a keyboard and pointing device system in the serial bus environment, and more specifically to a serial bus host controller having an 8042 compatible interface and special control logic for communicating with a serial bus keyboard and pointing device prior to the initialization of serial bus services.

2. Description of the Related Art

Computer systems are becoming ever more powerful with each passing moment. Many new advanced bus structures such as the PCI or Peripheral Component Interchange bus have been developed to allow greater performance of the computer system. Additionally, new devices and uses are being developed for the computer systems. In the past the computer has been essentially a stand-alone device or networked with other computer systems. However, today the modern personal computer is becoming a much more connected and multimedia oriented system. For example, now high speed video and audio functions are becoming commonplace and the integration with the telephone system has already begun.

However, many of these new features and existing devices such as the keyboard, mouse and serial and parallel ports are well below the ultimate bandwidth or capability of the advanced buses such as the PCI bus. Therefore, it is not efficient to connect each one of the functions and devices to the PCI bus directly, as this would impact bus loading and greatly increase overall costs. Additionally, many of these new functions are essentially serial in nature, with the data transferred in a bit stream rather than over a parallel bus structure. This is provided for many reasons, such as reduced wiring costs, and can be done because of the lower data rates which are required.

Therefore, it has been proposed to develop a serial bus architecture to connect all of these various lower bandwidth devices. The serial bus is organized with a host controller having a series of ports, which can then be connected either directly to devices or functions or to further hubs which have below them further devices or functions. A hub or the host controller may in addition incorporate functions if desired. In this manner a tree structure can be developed to allow a reasonable number of functions or devices to be attached to the serial bus system. The host controller connects to a bus in the computer system, for example the PCI bus, through the host controller. By having the host controller act as a concentrator, only a single connection to the PCI bus is necessary. The connection is better able to utilize the performance of the PCI bus without requiring numerous connections.

The host controller, each hub, and each function or port contain particular control registers for doing set up and initialization operations. In addition, three basic types of data transfer are defined in the serial bus system. The first type is isochronous, which is effectively a continuous real time transfer, such as telephony information or audio information. The second type is asynchronous block transfers, such as printer operations and conventional serial port operations, while the third type is asynchronous interactive device transfers, such as keyboard, mouse, pointing device, pen interfaces, and the configuration and status information, generally referred to as the control information, of the various devices.

Information is broadcast over the serial bus system from the host controller in a series of packets, with the host controller acting as the bus master and hubs and devices only responding upon request or polling access of the host controller. The packet types include data packets, token packets for use from host to device, a handshake packet and a special control packet. Data packets are the isochronous, asynchronous block, and asynchronous control types. Token packets allow transfer of data packets. Handshake packets are used to perform a ready handshake after transfer of a data or control packet to acknowledge successful receipt or indicate unsuccessful receipt. Special control packets are used for logical reset and status request transfers. Each function or device has a logical address. Packets are scheduled into queues for transmission over the serial bus in a time division multiplexed fashion.

Each device and port on a hub or the host controller includes the capabilities to handle the low level bus transfer protocol between the particular node of the appropriate hub and the device itself. Thus, a relatively simple transfer protocol, with a limited number of packet types is defined.

The hubs act as wiring concentrators and enable the attachment of multiple serial bus devices to the serial bus. A hub repeats incoming traffic from any enabled port by broadcasting the traffic transparently to all other enabled ports on the hub. As a result, the tree structured interconnect topology appears as a flat "virtual bus" with no store-and-forward type delays. More details on the serial bus architecture are provided in the Universal Serial Bus Specification 0.9, dated Mar. 20, 1995, available from Intel Corp. This specification is hereby incorporated by reference.

Of particular interest for the serial bus architecture is to consolidate the external peripheral devices so as to require only one PCI slot and provide a high level of ease of use. One particular problem arising from consolidation is that the interfacing methodology used before the advent of the serial bus is not compatible with the interfacing methodology of the serial bus. For example, the 8042 keyboard controller provides a well known register and command set for communicating with a pointing device and a keyboard via keyboard controller ports at I/O addresses 60h and 64h. Once the keyboard and pointing device functions are consolidated into the serial bus architecture, the keyboard and pointing device will no longer be found at I/O addresses 60h and 64h and communications to the keyboard and pointing device will be handled through the common serial bus interface. However, since the serial bus requires certain software drivers to be loaded, until the bus is fully operational there is a period of time when the keyboard and pointing device are unavailable. This could create undesirable results if a bootable device, such as SCSI disk or CD-ROM, power on system password, keyboard locking, or system configuration utilities were to require the user to input a keyboard or pointing device command before proceeding with the booting of the device. Thus, it is desirable to eliminate this problem.

One additional problem that is pervasive in the PC world involves the direct accessing of hardware by certain software. For example, game software is notorious for sidestepping the BIOS calls and accessing the keyboard and video registers directly to gain the highest performance possible from the computer. Once the keyboard function is consolidated into the serial bus, the register compatibility will no longer be present. Thus, to maintain compatibility with a relatively large base of software applications accessing the keyboard hardware directly, it is desirable to find a solution to this problem.

SUMMARY OF THE PRESENT INVENTION

A keyboard and pointing device system according to the present invention includes a serial bus host controller coupled to a serial bus keyboard and pointing device. The keyboard includes both keyboard scan logic and scan code conversion logic for passing to the host controller over the serial bus. The host controller includes circuitry for processing the data between the serial bus and a host bus. The host controller further includes 8042 emulation logic for providing a hardware compatible interface to the keyboard controller. In one embodiment the 8042 emulation logic also includes circuitry for communicating over the serial bus during times when the serial bus has not yet been initialized.

When the computer system is first powered on, the serial bus resources are not yet available since the software drivers have not been loaded. During this initialization period, the 8042 emulation logic handles communications to the serial bus keyboard and pointing device. After the serial bus services are initialized, data written to the 8042 emulation logic will be routed through the standard serial bus services.

The 8042 emulation logic also includes a means for locating the address of the keyboard and pointing device on the serial bus. Once located, the address is placed into a keyboard address register or pointing device address register for future reference.

In another embodiment the keyboard and pointing device are located using conventional serial bus operations and the 8042 emulation logic provides direct entries into the serial bus scheduling queue. In a further embodiment, write operations to the 8042 ports trigger interrupts to special software code, which interprets the written information and, based on emulating the 8042 keyboard controller, provides the proper data to the serial bus host controller. Read operations in this embodiment are performed either by having the serial bus host controller directly provide the data to emulated 8042 ports and provide the proper interrupt or by having simplified serial bus driver software receive the keyboard or pointing device packet normally, translate the packet data and then provide this data to simulated 8042 ports and provide the proper interrupt.

BRIEF DESCRIPTION OF THE DRAWINGS

A better understanding of the present invention can be obtained when the following detailed description of the preferred embodiment is considered in conjunction with the following drawings, in which:

FIG. 3A is a detailed block diagram of 8042 emulation block of the host controller according to the embodiment of FIG. 2;

DETAILED DESCRIPTION OF THE PREFERRED EMBODIMENT

Figure 1:
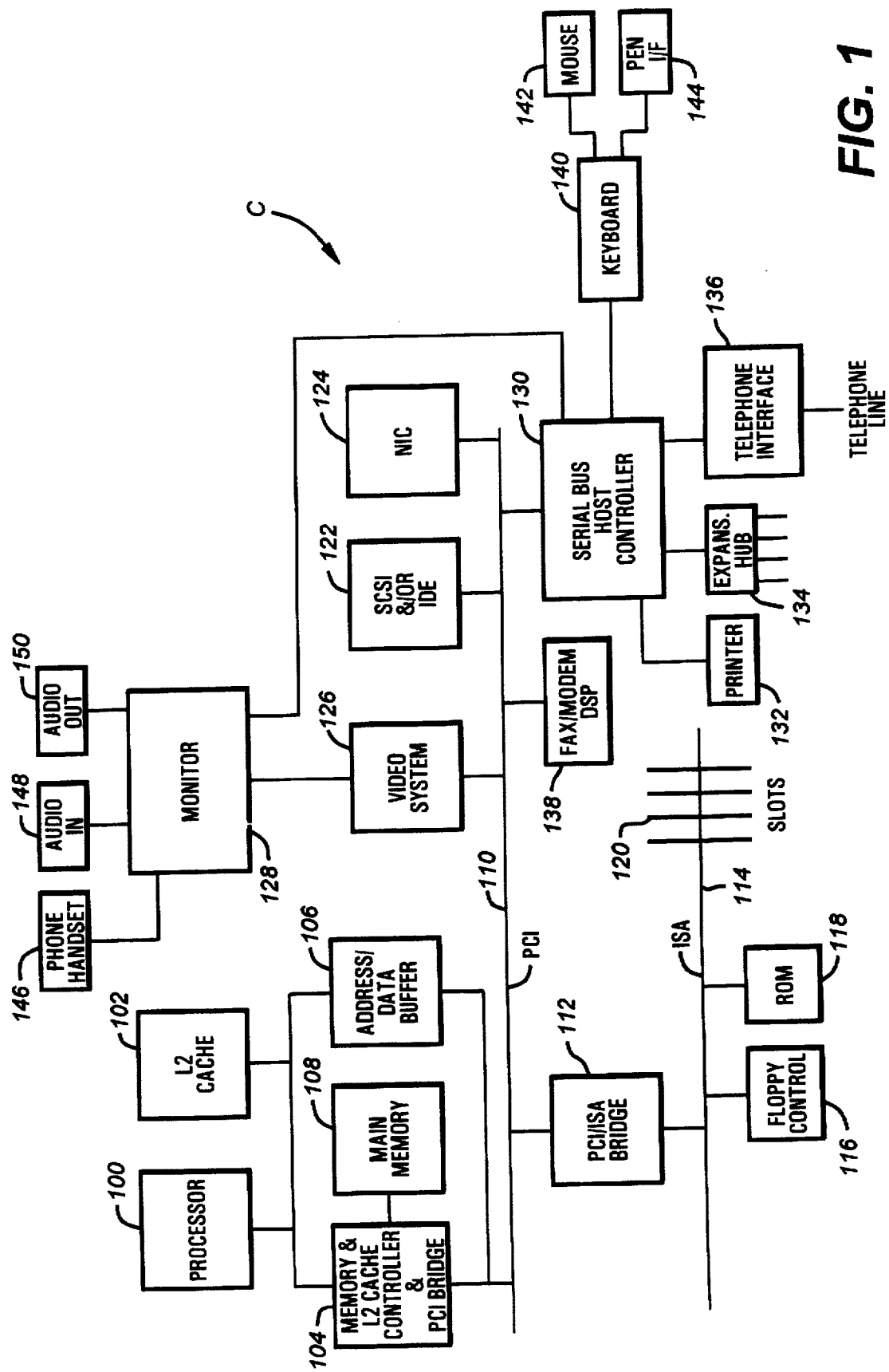
FIG. 1 is a block diagram of a computer system incorporating a serial bus system according to the preferred embodiment.

Referring now to FIG. 1, the computer system C according to the preferred embodiment is generally shown. The computer system C includes a processor 100 such as a Pentium® or 486 processor by Intel or their equivalents. It is understood that other processors could of course be utilized. The processor 100 is connected to a second level or L2 cache 102 and to a memory and L2 cache controller and PCI bridge 104 and address and data buffer 106. The main memory 108 of the computer system C is connected between the memory and L2 cache controller 104 and the address and data buffer 106. It is understood that the processor 100, cache 102, memory and cache controller 104, address and data buffer 106 and main memory 108 form the processor system and processor to PCI bus bridge according to a PCI system. It is understood of course that alternate processor systems and high speed bus architectures could be utilized if desired. Further, the address buffering could be included in the PCI bridge 104.

The PCI bridge 104 and address and data buffer 106 are connected to a PCI bus 110 which performs the high speed high performance back bone of the computer system C. A PCI to ISA (Industry Standard Architecture) bridge 110 is connected between the PCI bridge 110 and an ISA bus 114. A floppy disk controller 116 is connected to the ISA bus 114, as is the system ROM (read only memory) 118. The ROM 118 contains BIOS (basic input/output services) code for testing and initializing the computer system C and the serial bus. Additionally, there may be a plurality of ISA slots connected to the ISA bus 114 for receiving interchangeable cards.

The majority of the devices are connected to the PCI bus 110. For example, a SCSI or IDE (Intelligent Drive Electronics) controller 122 is connected to the PCI bus 110 and to the associated disk drives and other devices (not shown). A network interface card (NIC) 124 is also connected to the PCI bus 110 to allow high performance network connections. Further, a video graphics system 126 is connected to the PCI bus 110 and to an associated monitor 128. A fax/modem DSP (digital signal processor) 138 can also be connected to the PCI bus 110 for fax and modem data processing. As noted, this is an exemplary computer system architecture and is provided for explanation, variations being readily apparent to one skilled in the art.

Of interest to the present description, a serial bus host controller 130 is also connected to the PCI bus 110. The serial bus host controller 130 of the illustrated embodiment acts as both a host controller and a hub, with various hubs and functions connected to the host bus controller 130. For example, a printer 132 is connected to one port of the serial bus host controller 130, while an expansion hub 134 is connected to a second port. The expansion hub 134 provides further expansion capabilities, such as connecting to a keyboard 140 according to the present invention. The keyboard 140 further acts as a hub itself and a node, in that it is connected to the monitor hub but further contains ports to connect to the mouse 142 and a pen or stylus pointing device interface 144. This further physical connection is appropriate as those are the primary input devices and they are in most cases generally relatively near the keyboard 140 to ease use of operation. The keyboard interface will be described in more detail below. A telephony interface 136 containing the necessary CODEC and DAA components is connected to a third port and also receives a telephone line. The telephone line can be any of the available types such as an analog line, an ISDN line, a PBX connection and so on.

In the illustrated embodiment, the monitor 128 further acts as a hub and as a node. The monitor 128 is thus connected to one port of the serial bus host controller 130. The node or device function of the monitor 128 allows configuration of the monitor 128 independent from the high speed data utilized in the video system 126. The monitor 128 preferably acts as a hub because of the conventional physical arrangement of a modern computer system. Preferably, the system unit which contains the other devices is located under the desk or in a relatively remote location, with only the monitor 128, a keyboard 140, a pointing device such as a mouse 142 or pen 144, a telephone handset 146, and microphone and speakers relatively accessible to the user. As the monitor 128 effectively forms the central core of this unit, it is logically a proper location for a hub. It is noted that, although, preferably the keyboard is coupled to the monitor for physical convenience, for simplicity of explanation herein the keyboard is shown coupled directly to the host controller 130. The telephone handset 146 could be connected to one port of the monitor hub to receive digitized analog information either directly from the telephony interface 136 or as otherwise available, such as from an answering machine or voice mail function. The microphone is part of audio input circuitry 148 which is connected to a second port of the monitor hub, while audio output circuitry 150 contains the speakers used for audio output. In all cases, each one of the particular devices connected over the serial bus system includes control ports and configuration registers which need to be accessed by the processor 100 via the serial bus host controller 130 to allow control and setup of the individual devices. Thus it can be seen that in the computer, the relatively lower data rate functions are connected to the serial bus host controller 130 according to the serial bus system.

Figure 2:
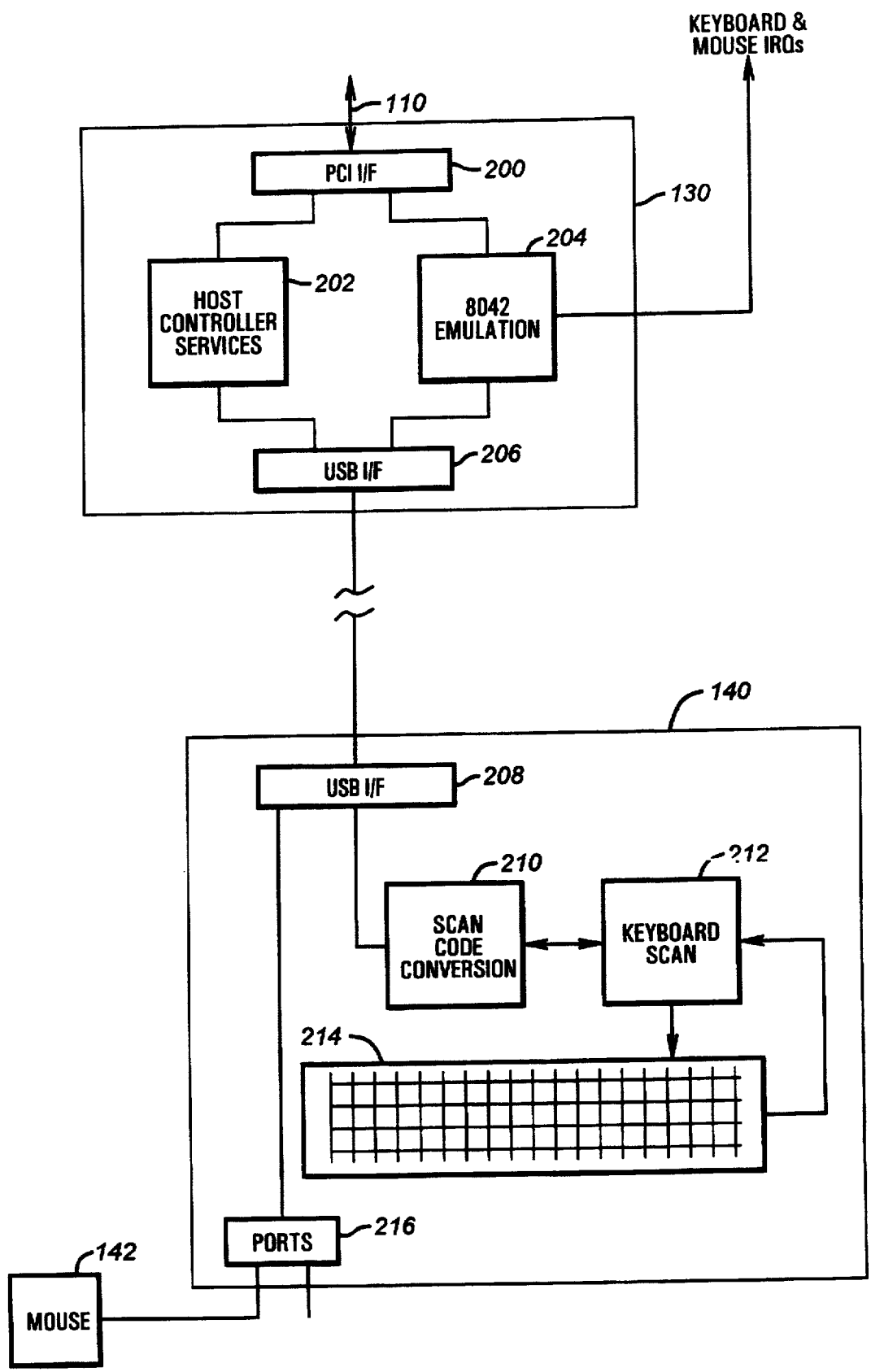
FIG. 2 is a block diagram illustrating a keyboard and mouse coupled to a serial bus host controller according to one embodiment.

Now referring to FIG. 2, the host controller 130 is shown connected to the keyboard 140. As described above, the keyboard 140 contains serial bus interface logic 208 for communicating with upstream ports and interface logic 216 for communicating with downstream ports, such as the mouse 142. The serial bus interface logic 208 provides the necessary functionality for encoding and decoding of packets to be transferred between the keyboard 140 and the host controller 130. Also included in the keyboard 140 is the keyboard matrix 214 for interacting with a computer user. Keyboard scan circuitry 212 is connected to the keyboard matrix 214 in typical fashion for generating scan codes when the keys of the matrix 214 are depressed. The scan codes are passed from the keyboard scan circuitry 212 to scan code conversion circuitry 210 also residing on the keyboard 140. Although the functionality of scanning and conversion is illustrated separately, it is contemplated that both functions can be easily handled by a single microcontroller. Because the keyboard scan logic 212 and the scan code conversion logic 210 are consolidated onto the keyboard 140, the host controller 130 is required to do little or no processing of the keystroke data. Thus, most processing of the scan codes and subsequent conversion into system scan codes or ASCII codes can easily be handled singly by the keyboard 140. The host controller 130 receives the processed scan codes for placement into the keyboard buffer of main memory 108.

The host controller 130 contains serial bus interface logic 206 for transmitting the packets over the serial bus cable. Communication over the serial bus is processed by host controller services 202. In addition, 8042 emulation logic 204 is also included in the host controller 130 and connected to the serial bus interface logic 206 for providing hardware level compatibility to the keyboard 140 and a mouse 142. Host system communications for both the host controller services 202 and the 8042 emulation logic 204 are handled by the PCI interface logic 200 which couples to the PCI bus 110. Additionally, the 8042 emulation logic 204 provides the conventional keyboard and mouse interrupts.

Figure 4:
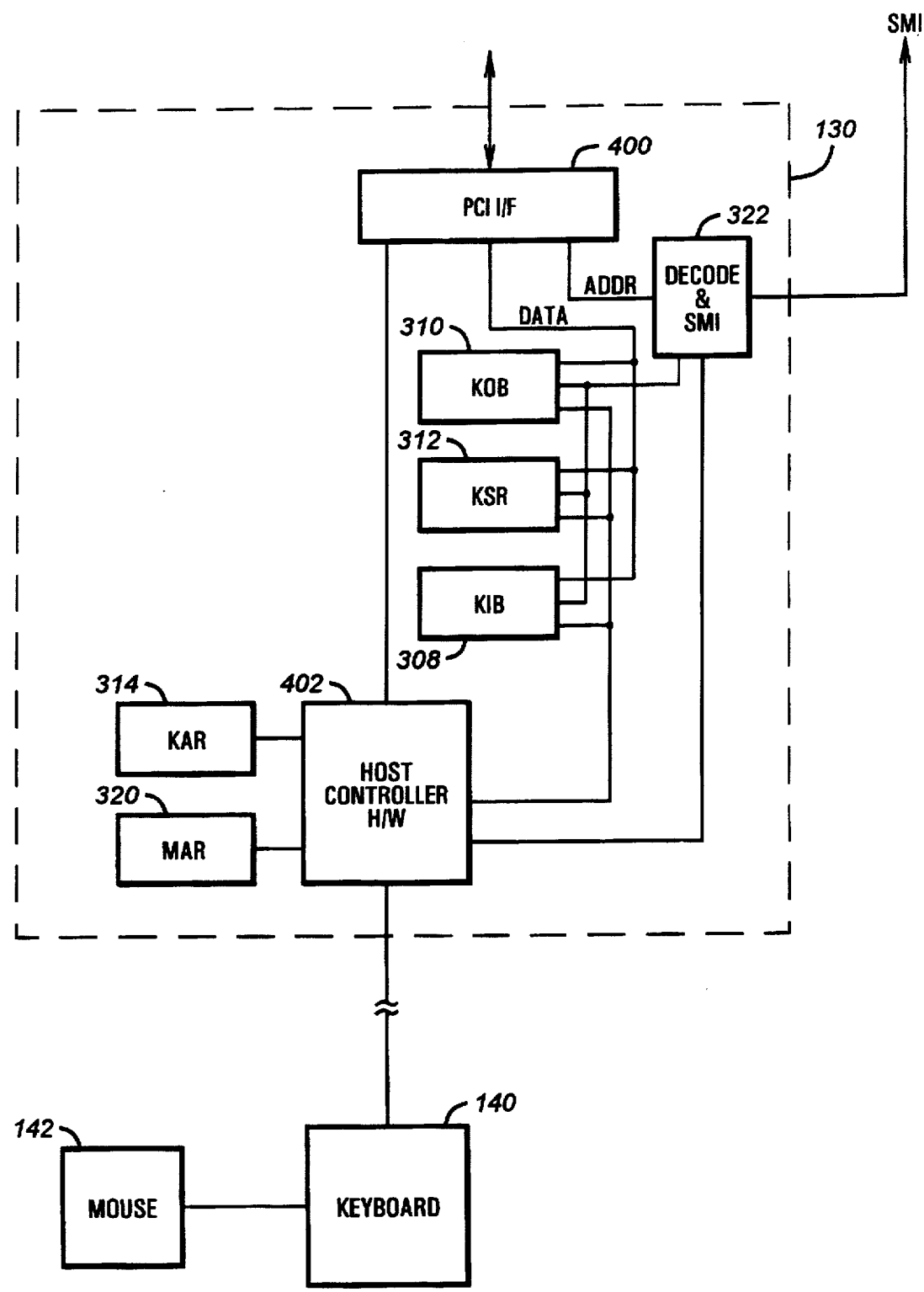
FIG. 4 is a block diagram illustrating a keyboard and mouse coupled to a serial bus host controller according to an alternative embodiment.

In many protected mode operating systems such as Windows 3.1, Windows 95 and OS/2, device drivers are responsible for communicating with low level hardware. In the case of these operating systems, 8042 register level compatibility is not as important as it is with DOS mode operations, since the device drivers can be adapted to different hardware configurations. When these operating systems are operational, the device drivers handle the keyboard communications via the host controller hardware 402 (FIG. 4). However, DOS application software and the boot operations often communicate directly with hardware. Therefore, the host controller 130 contains register level compatibility for a DOS mode application or boot operations to read from emulated 8042 registers and write to emulated 8042 registers.

In the operation of the keyboard 140 in conjunction with the serial bus and the host controller 130, keystrokes generated at the keyboard 140 are transferred upstream to the host controller 130. Data received from the keyboard 140 and mouse 142 are placed in a data output queue of the host controller services 202 if the 8042 logic emulation 204 is disabled and in a data register of the 8042 emulation logic 204 if the 8042 emulation logic 204 is enabled.

Now referring to FIG. 3A, the host controller 130 is described in more detail. The 8042 emulation logic 204 consists of the logic necessary to emulate an 8042 keyboard controller to the computer system C. References to an 8042 in this specification generally refer to an 8042 used as a keyboard controller in a PC-compatible computer. Further details on the operation of the 8042 itself can be found in datasheets from Intel Corporation and details of operation in a PC-compatible computer can be found in various books on the subject and are well known to those skilled in the art. In the present invention, the 8042 emulation logic 204 consists of interface logic 306 for decoding bus operations, a keyboard input buffer (KIB) 308, keyboard output buffer (KOB) 310 and a keyboard status register (KSR) 312. For compatibility, these registers are generally the same as in the 8042.

The 8042 interface logic 306 presents the same interface to the computer system C as would an actual 8042 keyboard controller. The 8042 interface logic 306 is therefore responsible generating an interrupt signal, responding to reading and writing port data and responding to various other 8042 commands. The ports P0 and P1 are supported for compatibility with the enable address line 20 (A20) and system reset signals and other proprietary 8042 output signals, however, since the A20 and reset signals are customarily mimicked or trapped by other logic on the system board, it is contemplated that those signals may not be provided.

The keyboard status register 312 is a read-only register residing at I/O address 64h. When the processor 100 performs a read operation to I/O address 64h and the 8042 emulation logic 204 is enabled, the host controller 130 places the contents of the keyboard status register 312 onto the PCI bus 110. As in the actual 8042, no flag or interrupt changes occur as a result of the read operation. The bit definitions for the keyboard status register 312 are shown in Table 1.

TABLE 1

| Bit | Contents |
| --- | --- |
| 0 | output buffer full flag (OBE) |
| 1 | input buffer full flag (IBF) |
| 2 | |
| 3 | input buffer contents flag (IBC) |
| 4 | |
| 5 | output buffer contents flag (OBC) |
| 6 | |
| 7 | |

The output buffer empty flag is set when the keyboard output buffer 310 is empty and may be loaded with a new byte. The input buffer full flag is set when the keyboard input buffer 308 contains either a command or data byte. The input buffer contents flag is set when the keyboard input buffer 308 contains a command and is reset when the keyboard input buffer 308 contains data. The output buffer content flag is set when the keyboard output buffer 310 contains mouse data and is reset when the keyboard output buffer 310 contains keyboard data.

The keyboard input buffer 308 is a write-only register residing at I/O addresses 60h and 64h. Data is written to I/O address 60h and commands are written to I/O address 64h. A write to I/O address 60h will:

1) set the keyboard input buffer full flag;
2) clear the input buffer contents flag; and
3) generate an input buffer full interrupt to the 8042 keyboard controller.

Subsequently, the data written to the keyboard input buffer 308 will be sent to the keyboard 140. Keyboard commands are written to the keyboard input buffer 308 residing at I/O address 64h. Commands written to this register are compatible with standard 8042 commands. A write to I/O address 64h:

1) sets the keyboard input buffer flag in the keyboard status register;
2) sets the input buffer contents flag in the keyboard status register; and
3) causes the 8042 emulation logic 204 to send the data to the keyboard 140.

The keyboard output buffer 310 is a read-only register residing at I/O address 60h. When a key is pressed at the keyboard 140 or the mouse 142 is moved or a button depressed the data representing the pressed key is received into keyboard output buffer 310 for reading by the processor 100. Also, the output buffer full flag is set and an interrupt is issued. A read to I/O address 60h will:

1) clear the output buffer full flag in the keyboard status register; and
2) clear any interrupt requests to the processor 100.

At the time of initialization of the computer system C, in the host controller 130 an enable register 316 is cleared so that during the initialization period a hardware queue and scheduler 318 is enabled. Also during this time it is noted that the host controller services 202 are not yet enabled so that the 8042 emulation logic 204 is the only means available for communicating with the keyboard 140. Once the computer system C is initialized and the drivers and software for control of the serial bus have been loaded, the hardware queue and scheduler 318 is disabled in favor of the main host controller services 202.

When the computer system C is first powered on, the host controller services 202 of the host controller 130 are not yet available since the drivers have not been loaded by the processor 100. During this time transmissions over the serial bus to the keyboard 140 are handled by the 8042 emulation logic 204, and more particularly the hardware queue and scheduler 318.

However, before any packet transmissions can take place between the host controller 130 and the keyboard 140, the host controller 130 must know the serial bus address of the keyboard 140. After the host controller 130 receives power, the hardware queue and scheduler 318 polls the serial bus looking for a device having a device type of keyboard. Once the keyboard 140 is located, the serial bus address of the keyboard is placed into a keyboard address register (KAR) 314. Similar operations are performed to locate the mouse 142, with its address being placed in a mouse address register (MAR) 315. These addresses are used by the 8042 emulation logic 204 in all future communications with the keyboard 140 and mouse 142.

During initialization, once data is written into the keyboard input buffer 308 and the command is given, a packet is generated by the hardware queue and scheduler 318. The packet includes the keyboard address, data and the command given. The packet will be sent to the keyboard 140 during the next frame period. By default, during each frame when no commands are sent to the keyboard 140, the hardware queue and scheduler 318 generates packets requesting the keyboard 140 to send data. If data is returned, it is placed in the keyboard output buffer 310 and the proper interrupt is issued. The processor 100 then reads the data from the keyboard output buffer 310 as if it where read from an actual 8042. If no data is ready to be transferred to the host controller 130, the keyboard 140 will not acknowledge (NACK) the packet. However, if the 8042 emulation logic 204 still contains a byte of data from the previous frame, the host controller 130 will not request an additional byte from the keyboard 140 until the previous byte has been read by the processor 100, but instead may query the keyboard status.

Once the serial bus software and drivers are loaded by the processor 100, the enable bit is set to disable the hardware queue and scheduler 318. From this time forward, data is received from the keyboard 140 into a data receive queue of the queue 302. The host controller 130 then issues an interrupt to indicate data availability. The serial bus driver then causes the processor 100 to remove the data from the queue and process it accordingly. Similarly, when the enable bit is set, data is provided to the keyboard 140 and mouse 142 through the host controller services 202 in a normal manner. Thus, the 8042 emulation logic 204 is used when 8042 hardware level emulation is desired and the standard host controller services 202 is used at other times when full driver support is available.

Thus, while the host controller of the preferred embodiment primarily serves as the main interface to the serial bus, it also provides backward compatibility with the keyboard and pointing device for communication during the initialization process when otherwise there would be none.

Figure 3B:
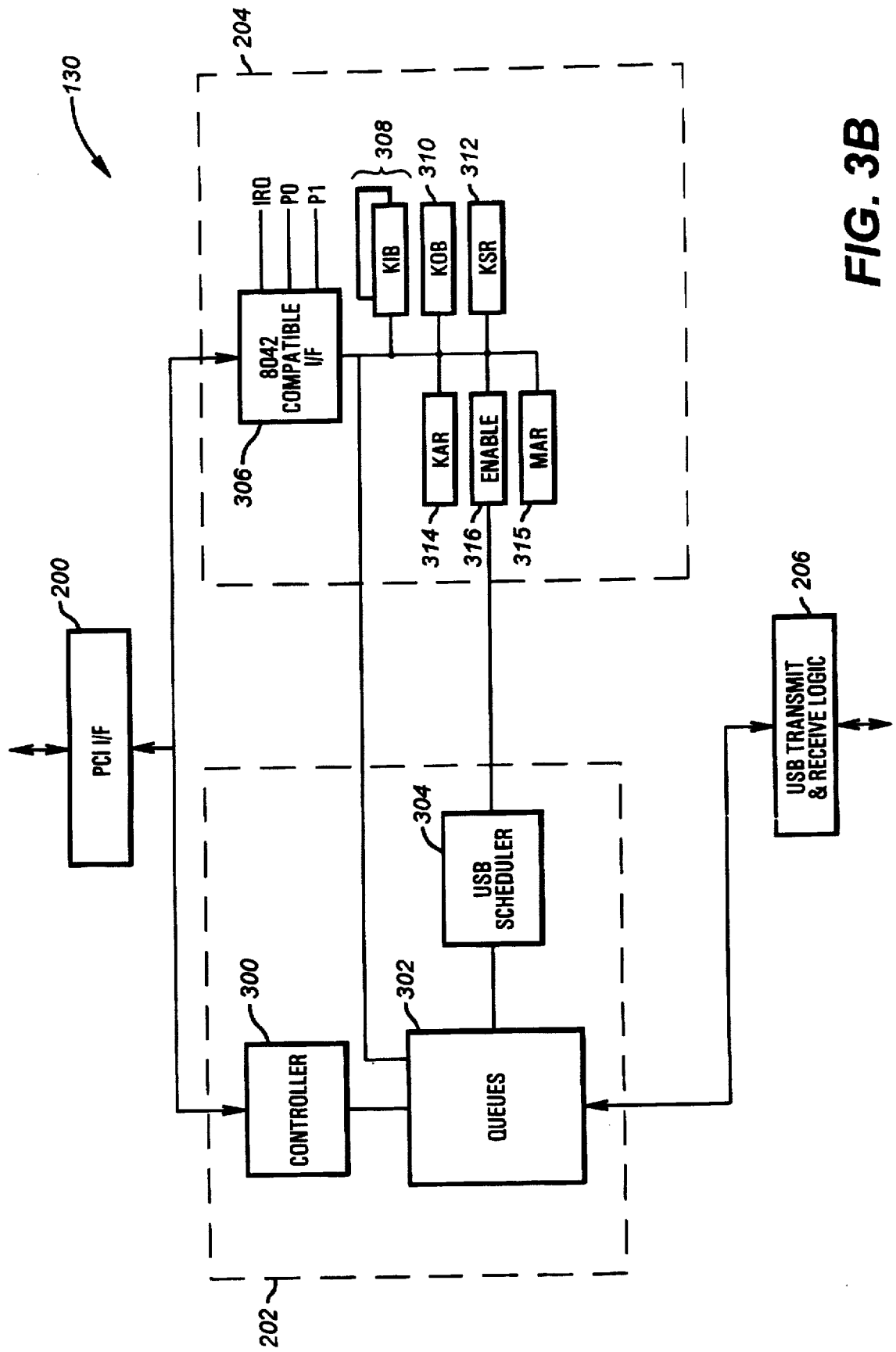
FIG. 3B is a detailed block diagram of simplified 8042 emulation logic of the host controller according to a variation of the embodiment of FIG. 3A.

It is contemplated that a variation on the embodiment illustrated in FIG. 3A could also provide the disclosed benefits. As shown in FIG. 3B, the 8042 emulation logic 204 does not include a separate hardware queue and scheduler, but instead the queue 302 and scheduler 304 of the host controller services 202 are utilized to provide the same functionality.

Figure 3C:
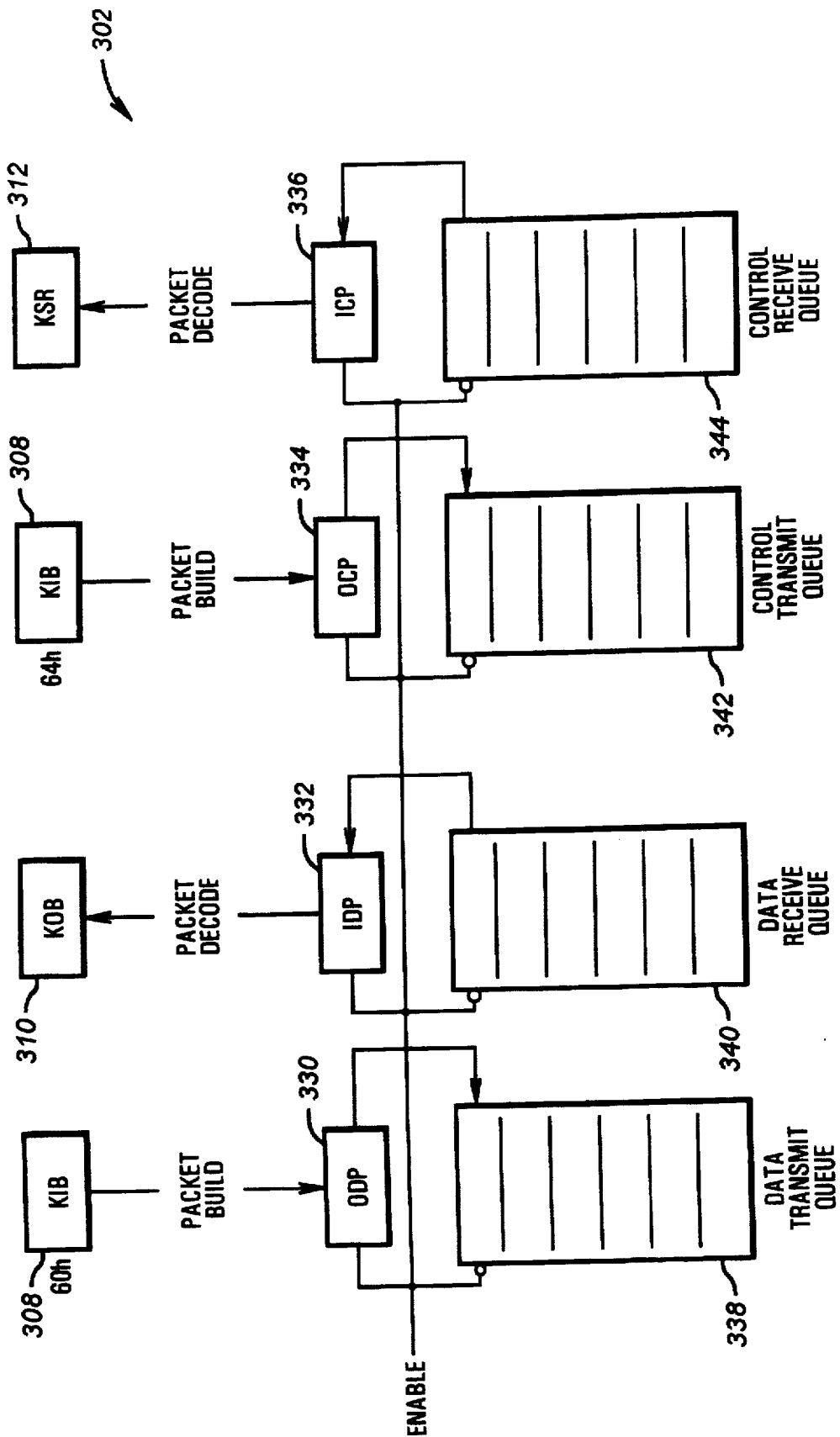
FIG. 3C is a detailed block diagram of the queue according to FIG. 3B.

The enable register 316 enables the 8042 emulation logic for accessing the registers at I/O address 60h and 64h. As shown in FIG. 3C, the queue 302 includes a number of data queues, 338 and 340, and control queues, 342 and 344, for transmitting and receiving packets over the serial bus. Packets generally contain a serial bus address, serial bus command and data if a write command. Commands can include read, write and status or polling commands.

In this embodiment, when the computer system C is first initialized, the 8042 emulation logic 204 is disabled. At this time, the BIOS constructs a packet and provides a series of packets to the control transmit queue 342 for querying the serial bus for a keyboard 140 and pointing device. When the device(s) are located, the addresses are stored in the keyboard address register 314 and mouse address register 315. Since the addresses are now contained within the host controller 130 hardware, the BIOS enables the 8042 emulation logic 204. At this point, communications between the keyboard 140 or pointing device and the processor 100, via the 8042 emulation logic 204, is enabled.

When the 8042 emulation logic 204 is enabled, the queues are stuffed with packets built according to the 8042 registers, as shown in FIG. 3C. If data is present in the keyboard input buffer 308, an output data packet 330 is provided to the data transmit queue 338 for transmission to the device on the next frame. If a command is present in the keyboard input buffer 308, a output command packet 334 is provided to the control transmit queue 342 for transmission to the device on the next frame. If no data or commands are present, then the output control packet 334 polls the keyboard 140 and pointing device 142 for data availability. If a device has data available, it may respond with a data packet, which is received into the data receive queue and subsequently transferred to the keyboard output buffer 310 and the proper interrupt is provided. The keyboard status register 312 is again constructed as described above with reference to FIG. 3A.

When the 8042 emulation logic 204 is disabled, the packets are built and controlled as normal. For more details on queues and packet construction and handling are described in patent application Ser. No. 08/346,097, entitled "Arbiter Organization for Serial Bus Transfers", filed Nov. 29, 1994, which is hereby incorporated by reference. The remaining operations are handled as described in FIG. 3A above.

An alternate embodiment to the foregoing keyboard and pointing device system of FIGS. 3A and 3B is illustrated in FIG. 4. The host controller 130 includes a PCI interface 400 for communicating PCI bus operations to the host controller 130 and the various serial bus devices. The host controller 130 also includes decode logic 322 for accessing a keyboard input buffer (KIB) 308, a keyboard output buffer (KOB) 310 and a keyboard status register (KSR) 312. It is noted that the KIB 308, KOB 310, KSR 312 and decode logic 322 can be conveniently located anywhere in the computer system C and need not be located in the host controller 130. The keyboard 140 and pointing device 142 use the same 8042 registers to communicate with the processor 100. A host controller hardware block 402 is also coupled to the PCI interface 400 for handling the serial bus operations on the serial bus.

Upon initialization of the computer system C, the BIOS or initialization code of the computer system C will cause the host controller 130 to search the serial bus for keyboard or pointing devices. If they are located, the serial bus address of the keyboard 140 is placed into a keyboard address register (KAR) 314 and the serial bus address of the pointing device 142 is placed into a mouse address register (MAR) 320. These registers 314 and 320 are accessible for all serial bus communications to these devices. The BIOS will also initialize the host controller 130 for polling the devices for data availability using the conventional serial bus techniques, queues and schedulers, though operation will be simplified as the operations will be very simple and very few devices will be controlled or monitored. This allows user interaction at the early stages of computer initialization and before the serial bus device drivers have loaded.

Figure 5:
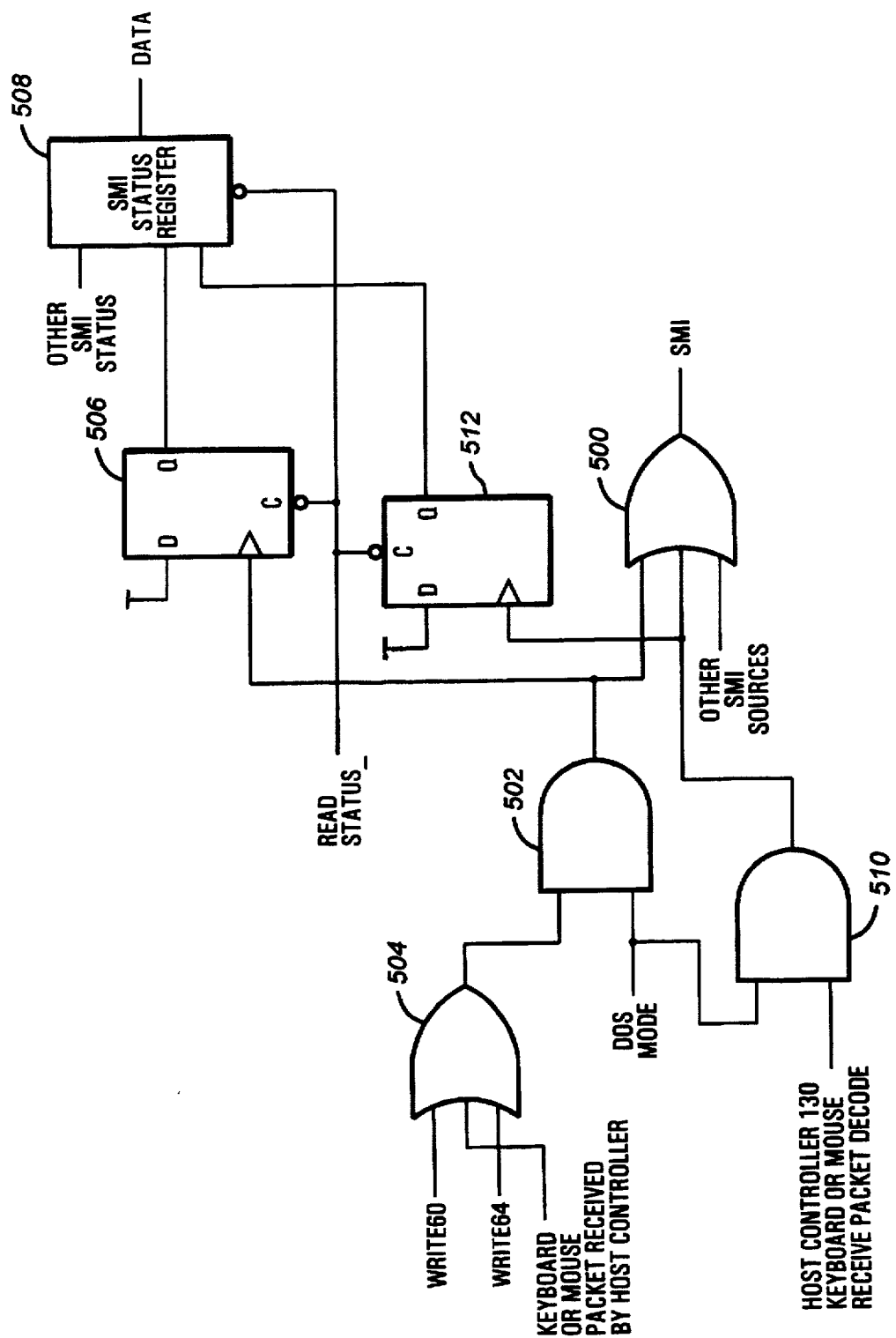
FIG. 5 is a detailed block diagram illustrating system management interrupt logic according to the FIG. 4 embodiment.
Figure 6A:
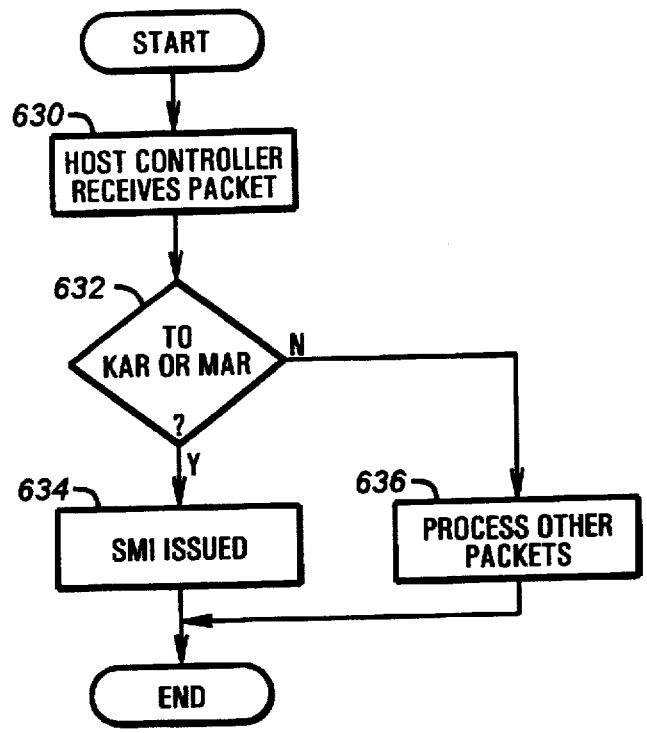
FIG. 6A is a flow diagram illustrating a received keyboard packet sequence according to the FIG. 4 embodiment.

When the host controller 130 receives a packet from the serial bus, as illustrated in FIG. 6A, step 630, it first checks the packet to determine whether the packet contains keyboard or mouse data, as shown in step 632. If so, at step 634 the host controller issues a system management interrupt using logic illustrated in FIG. 5. If not so, at step 636 the host controller processes the packets as conventional in serial bus operations.

Figure 6B:
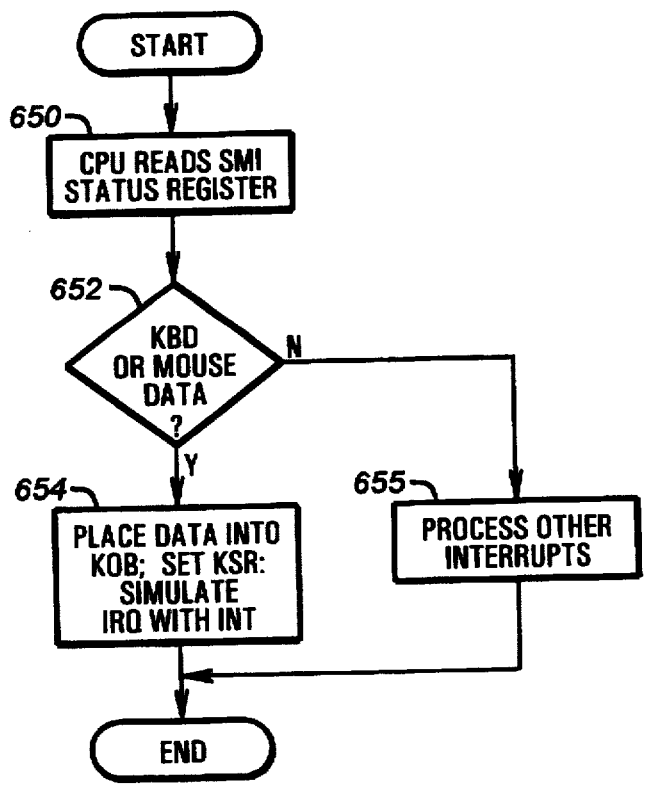
FIGS. 6B and 6C are flow diagrams illustrating processes handled by system mangement mode.

FIG. 6B illustrates the SMM code in response to the above generated SMI. At step 650, the processor 100 reads the SMI status register to determine if keyboard data caused the interrupt, as shown at step 652. If so, at step 654 the processor 100 obtains the keyboard data and places it into the keyboard output buffer 310, using an alternate address. The keyboard status register 312 is properly set in response to data being placed into the keyboard output buffer 310 and the hardware interrupt to the processor 100 is simulated with an INT instruction so that the keyboard data may be read at I/O address 60h and the status may be read from I/O address 64h. Alternatively, the processor 100 could direct alternate circuits (not shown) to provide the proper interrupt signal. Alternate addresses are used to prevent operation of the write trapping logic described below. Once the interrupt is simulated, or provided, the keyboard interrupt service routine then proceeds as normal to read the keyboard status register 312 using conventional operations to further determine the source of the keyboard interrupt and finally reading the keyboard output buffer 310 if data is present. If at step 652 the processor determines that the SMI interrupt was not caused by the keyboard controller 140, then control proceeds to step 655 where the other interrupts are processed as normal. Data received from the pointing device or mouse 142 is handled in a similar manner.

Figure 6C:
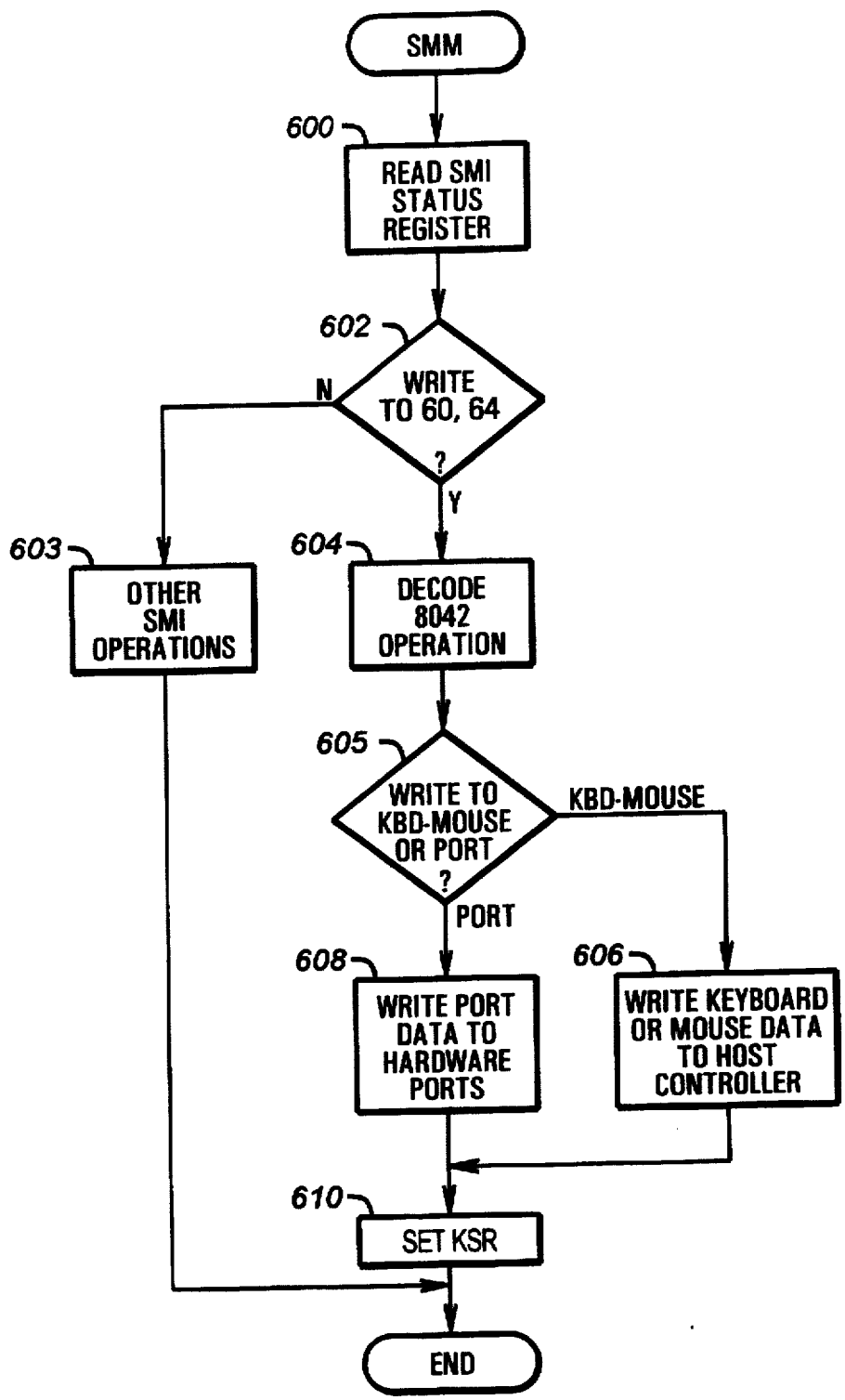
Figure 6D:
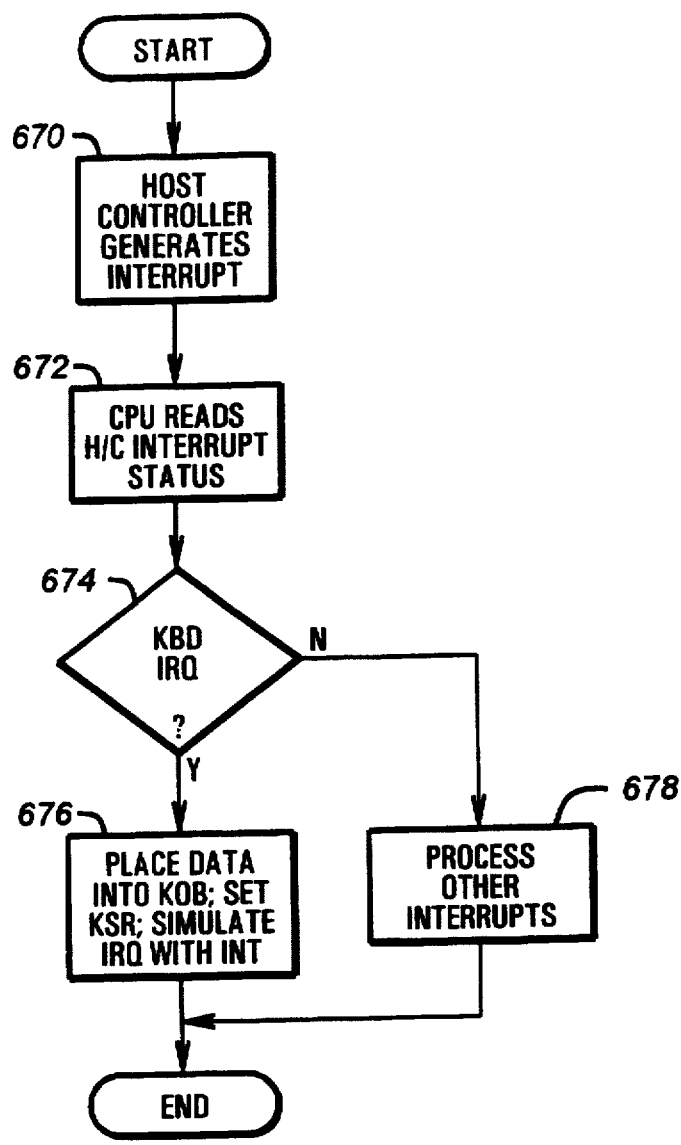
FIG. 6D is a flow diagram illustrating an alternative method of moving data from packets to the 8042 emulation logic.

An alternative to using the system management mode is to use the normal hardware interrupt provided for use by the host controller 130. This alternate does not require a KAR 314 or MAR 320 but may not be compatible with applications which disable interrupts and poll the KSR 312. When the host controller 130 receives a scan code from the keyboard 140 or data from the pointing device 142 it generates a host controller interrupt to the processor 100, as illustrated in FIG. 6D, step 670, as conventional in serial bus operations. Next, at step 672, using a simplified serial bus driver located in the BIOS, the processor 100 reads the host controller interrupt status to determine the source of the serial bus interrupt. As shown at step 674, the processor 100 determines if the host controller interrupt is caused by receipt of a keyboard scan code. If so, then control proceeds to step 676 where alternate addresses are used to place the received data into the keyboard output buffer 310 and the keyboard status register 312 is properly set. Alternate addresses are used to prevent operation of the writing trapping logic described below. After the buffer 310 and register 312 are prepared, an 8042 interrupt, IRQ1, is simulated in software with the INT command. The keyboard interrupt service routine then proceeds as normal to read the keyboard status register 312 using conventional operations to further determine the source of the keyboard interrupt and finally reading the keyboard output buffer 310 if data is present. If at step 674 the processor determines that the host controller interrupt was not caused by the keyboard controller 140, then control proceeds to step 678 where the other operations are processed as normal. Data received from the pointing device or mouse 142 is handled in a similar manner.

In an alternative embodiment, if the KIB 308, KOB 310, and KSR 312 are located in the host controller 130, the host controller 130 could directly place the data in the keyboard output buffer 310, set the status register 312, and provide the keyboard interrupt, but additional circuitry is required for this embodiment to decode the packets and to place the data and generate the interrupt and so is not preferred.

Write operations to I/O addresses 60h and 64h are handled by the host controller 130 in conjunction with software, as described below. FIG. 6C illustrates processing of a write operation to I/O address 60h or 64h. A write to I/O address 60h or 64h of the KIB 308 causes a system management interrupt (SMI) to be generated. This circuitry is shown in more detail in FIG. 5. When the system management interrupt is generated, the processor 100 enters system management mode. Operation of the system management mode code is shown in FIG. 6C. First in step 600 the processor 100 reads a system management interrupt status register to determine the source of the interrupt. In step 602 the processor 100 determines if a write to I/O ports 60h or 64h had caused the interrupt. If not, processing of the other SMI operations proceeds at step 603. If a write to 60h or 64h had occurred, the SMI code decodes the value written to the KIB 308 to determine the requested 8042 operation, as shown at step 604. Registers are actually provided at I/O addresses 60 and 64 to receive the data or command. The SMI code reads those registers using alternate addresses to prevent possible reentry in SMM. To perform the decoding function the SMI code effectively emulates or replicates the majority of the 8042 keyboard controller command logic. At step 605 the processor 100 determines if the decoded operation was a command to the keyboard 140 or mouse 142 or a write to an 8042 output port. If a keyboard 140 or mouse 142 command, at step 606 the processor 100 writes any keyboard or pointing device data to the host controller 130 for forwarding to the respective device over the serial bus. This operation is done using conventional, albeit simplified, serial bus services provided in the BIOS. If the I/O operation was a write operation to one of the other output bits of the 8042 ports, then at step 608 that data is transmitted to hardware compatible ports contained elsewhere to emulate the desired output bit. Other signals formerly generated or sensed by the 8042 port logic are supported in the system at other available addresses or ports as one skilled in the art would appreciate. After steps 606 and 608 the SMI code properly sets the KSR 312 in step 610 and then after steps 603 or 610 operation of the SMI code ends.

It is understood that FIGS. 6A and 6B are combined into a single routine, if the host controller 130 according to FIG. 4 which provides an SMI upon receipt of a keyboard or mouse data packet is utilized. FIG. 6B has been illustrated separately for clarity with the various alternatives.

FIG. 5 illustrates a functional block diagram of system management interrupt logic for the keyboard system. The system management interrupt (SMI) signal is provided to the processor 100 by an OR gate 500. One input to the OR gate 500 is from the other SMI sources of the computer system C, while an other input of the OR gate 500 is received from the output of an AND gate 502. The output of the AND gate 502 is generated when the computer is in DOS emulation mode so that emulation of the 8042 is active and a write operation is attempted to I/O address 60h or 64h, as illustrated by OR-gate 504. If emulation mode is not active, no SMI is generated and the written data is ignored. When emulation is not active, the host controller services 202 must be used to provide commands to the keyboard 140 and mouse 142.

The output from the AND gate 502 also provides a clock signal for a D flip-flop 506. The output from the D flip-flop 506 is provided to one bit of an SMI status register 508 for providing SMI status to the processor 100. When the processor reads the status from the SMI status register 508 the status bit is cleared. From reading the SMI status register 508 the processor 100 can determine the source of the SMI interrupt and process the interrupt accordingly.

The OR gate 500 also receives the output of an AND gate 510, which receives the DOS MODE signal and the indication from the host controller 130 that a keyboard or mouse packet has been received. This provides the SMI needed in that case, unless emulation is not active. The output of AND gate 510 is provided to the clock input of a D flip-flop 512, which has its D input connected high and its output provided to the SMI status register 508. The flip-flop 512 is cleared when the status register is read.

The DOS mode signal is provided from an arbitrary configuration register which is not shown. When emulation mode is inactive, the serial bus interrupt provided by the host controller 130 will activate a loaded, complete serial bus device driver, rather than the simplified serial bus driver provided in the BIOS, which simplified driver is aware when emulation mode is active and can provide the data to the KOB 310 and KSR 312 and interrupt as described above. This complete driver will not provide data to the keyboard output buffer 310 or the keyboard status register 312 or set the 8042 interrupt, but will instead operate according to standard serial bus operations.

In the alternative where the SMI signal is provided on keyboard data packet receipt, the DOS MODE signal blocks the generation of the SMI signal when emulation is inactive and a conventional serial bus interrupt is provided as the packet checking logic is also disabled.

Therefore, as compared to the first alternative shown in FIGS. 2 and 3, this alternative illustrated in FIGS. 4–6 includes a reduced level of 8042 hardware level compatibility in exchange for greater software complexity. Both methods provide the desired 8042 compatibility for times when the complete serial bus device drivers are not available.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A serial bus host controller for coupling a serial bus keyboard to a computer system via a standardized serial bus which transfers data in a packetized protocol, the serial bus host controller for sending and receiving serial bus packets, the serial bus host controller comprising:

a keyboard controller emulator for generating and receiving data, status and commands pertaining to the serial bus keyboard, said keyboard controller emulator including:

a serial bus address register for storing the serial bus address of the serial bus keyboard;

a data buffer; and a status register;

a detector for detecting when said data buffer and said status register are accessed; and an interrupt generator for providing a system management interrupt to the computer system when said data buffer and said status register are accessed.

2. The serial bus host controller of claim 1, wherein said detector further detects if a packet is received from said serial bus keyboard, and wherein said interrupt generator provides a system management interrupt to the computer system if a packet is received from said serial bus keyboard.

3. The serial bus host controller of claim 2, wherein said interrupt causes the computer system to place the serial bus keyboard data into said data buffer and causes said status buffer to be updated if a packet is received from said serial bus keyboard.

4. The serial bus host controller of claim 1, further including a switch for enabling and disabling said keyboard controller emulator.

5. The serial bus host controller of claim 1 wherein said serial bus keyboard includes a serial bus mouse.

6. A computer system for coupling to a serial bus keyboard via a standardized serial bus which transfers data in a packetized protocol, the computer system comprising:

a serial bus keyboard; and a serial bus host controller coupled to said serial bus keyboard for sending and receiving serial bus packets, comprising:

a keyboard controller emulator for generating and receiving data, status and commands pertaining to the serial bus keyboard, said keyboard controller emulator including:

a serial bus address register for storing the serial bus address of the serial bus keyboard;

a data buffer; and a status register;

a detector for detecting when said data buffer and said status register are accessed; and an interrupt generator for providing a system management interrupt to the computer system when said data buffer and said status register are accessed.

7. The computer system of claim 6, wherein said detector further detects if a packet is received from said serial bus keyboard, and wherein said interrupt generator provides a system management interrupt to the computer system if a packet is received from said serial bus keyboard.

8. The computer system of claim 7, wherein said interrupt causes the computer system to place the serial bus keyboard data into said data buffer and causes said status buffer to be updated if a packet is received from said serial bus keyboard.

9. The computer system of claim 6, further including a switch for enabling and disabling said keyboard controller emulator.

10. The computer system of claim 6 wherein said serial bus keyboard includes a serial bus mouse.

11. A serial bus host controller for coupling a serial bus keyboard to a computer system via a standardized serial bus which transfers data in a packetized protocol, the serial bus host controller for sending and receiving serial bus packets, the serial bus host controller comprising:

a keyboard controller emulator for generating and receiving data, status and commands pertaining to the serial bus keyboard, including:

a serial bus address register for storing the serial bus address of the serial bus keyboard;

a data input buffer;

a data output buffer, said keyboard controller providing an interrupt when said data output buffer is changed; and a status register; and a detector for detecting when the data buffers and said status register are accessed;

packet parsing logic for determining if a packet is received from the serial bus keyboard;

data output buffer writing logic for writing into said data output buffer a data value extracted from a packet received from said serial bus keyboard; and data input buffer reading logic for reading from said data input buffer a data value written therein by the computer system for said serial bus keyboard and developing a packet for transmission to said serial bus keyboard, wherein when said data value is written into said data output buffer a keyboard controller interrupt is generated.

12. The serial bus host controller of claim 11 wherein said serial bus keyboard includes a serial bus mouse.

13. The serial bus host controller of claim 11 wherein said interrupt is a system management interrupt.

14. The serial bus host controller of claim 11, further including a switch for enabling and disabling said keyboard controller emulator.

15. A computer system for coupling to a serial bus keyboard via a standardized serial bus which transfers data in a packetized protocol, the computer system comprising:

a serial bus keyboard; and a serial bus host controller coupled to said serial bus keyboard for sending and receiving serial bus packets,, comprising:

a keyboard controller emulator for generating and receiving data, status and commands pertaining to the serial bus keyboard, including:

a serial bus address register for storing the serial bus address of the serial bus keyboard;

a data input buffer;

a data output buffer, said keyboard controller providing an interrupt when said data output buffer is changed; and a status register; and a detector for detecting when the data buffers and said status register are accessed;

packet parsing logic for determining if a packet is received from the serial bus keyboard;

data output buffer writing logic for writing into said data output buffer a data value extracted from a packet received from said serial bus keyboard; and data input buffer reading logic for reading from said data input buffer a data value written therein by the computer system for said serial bus keyboard and developing a packet for transmission to said serial bus keyboard, wherein when said data value is written into said data output buffer a keyboard controller interrupt is generated.

16. The computer system of claim 15 wherein said serial bus keyboard includes a serial bus mouse.

17. The computer system of claim 15 wherein said interrupt is a system management interrupt.

18. The computer system of claim 15, further including a switch for enabling and disabling said keyboard controller emulator.

19. A method of communicating with a serial bus keyboard over a standardized serial bus in a computer system having a serial bus host controller, said host controller including a keyboard controller emulator, the keyboard controller emulator including a queue and scheduler for communicating directly with the serial bus, the method comprising the steps of:

(a) powering on the computer system;

(b) enabling a keyboard controller queue and scheduler;

(c) said keyboard controller queue and scheduler polling the serial bus for a serial bus keyboard;

(d) determining an -address of said serial bus keyboard;

(e) storing said serial bus keyboard address in a register;

(f) said keyboard controller emulator processing packets, if any, with the serial bus keyboard until the host controller is initialized;

(g) loading a host controller device driver; and (h) disabling said keyboard controller queue and scheduler after said host controller device driver is loaded.

20. The method of claim 19, wherein said keyboard controller emulator includes a data input buffer, the method further comprising the steps of:

(i) said keyboard controller queue and scheduler generating a packet for said serial bus keyboard if data is received into said data input buffer before said device driver is loaded; and (j) said keyboard controller queue and scheduler transmitting said packet for said serial bus keyboard utilizing the stored address if data is received into said data input buffer before said device driver is loaded.

21. The method of claim 19, wherein said keyboard controller emulator includes a data output buffer, the method further comprising the steps of:

(k) placing keyboard data into said data output buffer if a packet is received from said serial bus keyboard before said device driver is loaded; and (l) generating an interrupt to said computer system if data is placed into said data output buffer.

22. A method of communicating with a serial bus keyboard over a standardized serial bus in a computer system having a serial bus host controller and a basic input/output system (BIOS) for controlling device initialization, said host controller including a keyboard controller emulator, the method comprising the steps of:

(a) powering on the computer system;

(b) disabling the keyboard controller emulator;

(c) the BIOS polling the serial bus for a serial bus keyboard;

(d) the BIOS determining an address of said serial bus keyboard;

(e) the BIOS storing said serial bus keyboard address in a register;

(f) the BIOS enabling the keyboard controller emulator;

(g) the BIOS handling any communications between the computer system and the serial bus keyboard until a host controller device driver is loaded;

(h) loading a host controller device driver; and (i) disabling the keyboard controller emulator.

23. The method of claim 22, wherein said keyboard controller emulator includes a data input buffer, the method further comprising the step of:

(j) the BIOS generating a packet for said serial bus keyboard if data is received into said data input buffer before said device driver is loaded.

24. The method of claim 22, wherein said keyboard controller emulator includes a data output buffer, the method further comprising the steps of:

(k) the BIOS placing keyboard data into said data output buffer if a packet is received from said serial bus keyboard before said device driver is loaded; and (l) generating an interrupt to said computer system if data is placed into said data output buffer.

25. A method of communicating with a serial bus keyboard over a standardized serial bus in a computer system having a serial bus host controller, said host controller including a keyboard controller emulator, the method comprising the steps of:

(a) powering on the computer system;

(b) polling the serial bus for a serial bus keyboard;

(c) determining an address of said serial bus keyboard;

(d) storing said serial bus keyboard address in a register;

(e) loading a host controller keyboard device driver;

(f) generating a system management interrupt (SMI) if keyboard data is received by the host controller; and (g) processing the keyboard data.

26. The method of claim 25, wherein step (f) further comprises the steps of:

(h) receiving a serial bus packet; and (i) determining if said serial bus packet contains keyboard data.

27. The method of claim 25, wherein step (g) is performed in system management mode.

28. The method of claim 25, wherein the keyboard emulator includes a data output buffer and a status register, and wherein step (g) further comprises the steps of:

(j) writing the keyboard data into the keyboard output buffer if keyboard data is received by the host controller;

(k) setting the status register to reflect the data written to the keyboard output buffer; and (l) providing a keyboard controller interrupt.

29. The method of claim 28, wherein the computer system further includes an SMI status register, the method further comprising the steps of:

(m) reading the SMI status register before step (j); and (n) determining a source of the system management interrupt from said SMI status register.

30. The method of claim 28, wherein said keyboard controller interrupt is simulated with an INT instruction.

31. The method of claim 25, wherein the computer system further includes an SMI status register and wherein the keyboard emulator includes a data input buffer, the method further comprising the steps of:

(o) generating a system management interrupt (SMI) if data is written to the keyboard input buffer;

(p) reading the SMI status register;

(q) determining a source of a system management interrupt from said SMI status register;

(r) reading the keyboard input buffer if the source is the keyboard emulator; and (s) forwarding the keyboard input buffer data to the host controller for transmission to the serial bus keyboard if the source is the keyboard emulator.

32. A method of communicating with a serial bus keyboard over a standardized serial bus in a computer system having a serial bus host controller, the host controller including a keyboard controller emulator, the keyboard controller emulator having a data output buffer and a status register, the method comprising the steps of:

(a) initializing the host controller;
(b) generating a host controller interrupt if a packet is received by the host controller;
(c) determining a source of the packet;
(d) writing packet data into the data output buffer if the packet source is the serial bus keyboard;
(e) updating the status register if data is written into the data output buffer; and
(f) generating a keyboard controller interrupt.

33. The method of claim 32 wherein said keyboard controller interrupt is simulated with an INT instruction.

* * * * *

UNITED STATES PATENT AND TRADEMARK OFFICE
CERTIFICATE OF CORRECTION

PATENT NO. : 5,802,318

DATED : 9/1/98

INVENTOR(S) : DAVID E. MURRAY, DAVID R. WOOTEN, RANDALL L. HESS, CHRISTOPHER C. WANNER, JEFF W. WOLFORD

It is certified that error appears in the above-identified patent and that said Letters Patent is hereby corrected as shown below:

IN CLAIM 15, LINE 34, PLEASE DELETE THE SECOND COMMA AFTER "PACKETS"

IN CLAIM 19, LINE 12, PLEASE DELETE THE DASH BEFORE "ADDRESS"

Signed and Sealed this

Eighth Day of December, 1998

*Attest:*

BRUCE LEHMAN

*Attesting Officer*   Commissioner of Patents and Trademarks